UNITED STATES PATENT OFFICE.

CAMPBELL C. CARPENTER, OF NIAGARA FALLS, NEW YORK, ASSIGNOR TO U. S. LIGHT & HEAT CORPORATION, OF NIAGARA FALLS, NEW YORK, A CORPORATION OF NEW YORK.

WELDING-ELECTRODE.

1,324,227.     Specification of Letters Patent.     Patented Dec. 9, 1919.

No Drawing.     Application filed March 19, 1919. Serial No. 283,600½.

*To all whom it may concern:*

Be it known that I, CAMPBELL C. CARPENTER, a citizen of the United States, residing at Niagara Falls, in the county of Niagara and State of New York, have invented new and useful Improvements in Welding-Electrodes, of which the following is a specification.

The present invention relates to welding electrodes.

Various means have been provided for improving the quality of the weld formed by metallic electrodes in electric welding. For this purpose the metallic electrode has been coated with a substance which, at the welding temperature, will form a gas or molten liquid. This coating, when gasified or liquefied, has the function of protecting the weld from the surrounding air. One difficulty that has been encountered with such coatings is that the coating is fragile and readily chips off of the electrode, both during the storage of the electrode and during the use of the electrode.

An object of the present invention is to provide an electrode coating which will protect the deposited metal during the welding process and which will be firm and free from chipping from the electrode with ordinary usage.

A further object is to provide a method of coating electrodes which will result in an improved product, whereby a coating will be produced which will not chip off.

In carrying out the present invention, the electrode is first rendered free from oil. For this purpose a soap and caustic solution or any other oil solvent may be used. The electrode is also freed from all traces of rust by mechanical or chemical means.

After the electrode is perfectly clean it may be coated with any of the well known coatings such as the combinations of sodium silicate and calcium carbonate. When this coating is thoroughly dry, it is covered with a layer consisting of a substance impervious to moisture, thus protecting the underlying coating as well as the underlying metal from air and moisture. This coating should also preferably have the property that when decomposed by heat, non-oxidizing gases will be formed at the welded surface, thus preventing oxidization of the weld. The superposed layer may be nitrated cotton, acetone mixture, such as known in the art as celluloid lacquers or it may be ordinary spirit gum lacquers.

The resulting electrode will be sturdy and will withstand ordinary usage. The moisture in the air will have no effect upon it, so that electrodes may be made up long in advance of the time that they are to be used.

One embodiment of the present invention has been described in detail. Many modifications will occur to those skilled in the art. It is intended that the patent shall cover all such modifications that come within the scope of the invention as defined by the appended claims.

What I claim as new and desire to secure by Letters Patent of the United States, is—

1. A welding electrode comprising a metallic member, a coating on said member having the function, when liquefied or gasified, of protecting the welded surface from the surrounding air, and a protecting coating for said first mentioned coating consisting of a substance impervious to moisture.

2. A welding electrode comprising a metallic member, a coating on said member having the function, when liquefied or gasified, of protecting the welded surface from the surrounding air, and a protecting coating for said first mentioned coating consisting of a substance impervious to moisture, said second mentioned coating having the property that when decomposed by heat, non-oxidizing gases will be formed.

3. The method of protecting coated welding electrodes which consists in coating with a substance impervious to moisture.

4. The method of protecting coated welding electrodes which consists in coating with a substance impervious to moisture which, at welding temperatures, will decompose to form a non-oxidizing gas.

5. A welding electrode comprising a welding member, a coating therefor having the function, when gasified or liquefied, of protecting the welded surface and a coating for said first coating for protecting said first coating from mechanical injury and attack due to moisture or other chemical substances in the air.

6. A welding electrode comprising a welding member, a coating therefor having the function, when gasified or liquefied, of protecting the welded surface and a coating for said first coating for protecting said first coating from mechanical injury and attack due to moisture or other chemical substances in the air, said second mentioned coating having the property of decomposing at welding temperatures to form non-oxidizing gas to protect the welded surface.

In witness whereof, I have hereunto subscribed my name.

CAMPBELL C. CARPENTER.